(12) United States Patent
Hua et al.

(10) Patent No.: US 9,756,016 B2
(45) Date of Patent: Sep. 5, 2017

(54) SECURITY SERVICES FOR END USERS THAT UTILIZE SERVICE CHAINING

(71) Applicant: Alcatel-Lucent USA Inc., Murray Hill, NJ (US)

(72) Inventors: Suzann Hua, Lisle, IL (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 157 days.

(21) Appl. No.: 14/528,874

(22) Filed: Oct. 30, 2014

(65) Prior Publication Data
US 2016/0127318 A1   May 5, 2016

(51) Int. Cl.
| | |
|---|---|
| H04L 29/06 | (2006.01) |
| H04L 29/08 | (2006.01) |
| H04L 12/14 | (2006.01) |
| H04W 4/24 | (2009.01) |
| H04W 12/06 | (2009.01) |
| H04L 12/24 | (2006.01) |
| H04W 12/08 | (2009.01) |

(52) U.S. Cl.
CPC ...... *H04L 63/0263* (2013.01); *H04L 12/1403* (2013.01); *H04L 41/0893* (2013.01); *H04L 63/20* (2013.01); *H04L 63/205* (2013.01); *H04L 67/16* (2013.01); *H04W 4/24* (2013.01); *H04W 12/06* (2013.01); *H04L 12/1467* (2013.01); *H04L 12/1485* (2013.01); *H04W 12/08* (2013.01)

(58) Field of Classification Search
CPC .... H04L 63/0263; H04L 12/24; H04W 4/008; H04W 12/08; H04W 28/02; H04M 1/66
USPC ......... 705/30, 400; 370/401; 455/436; 726/1
See application file for complete search history.

(56) References Cited

U.S. PATENT DOCUMENTS

| | | | |
|---|---|---|---|
| 7,948,952 B2 | 5/2011 | Hurtta et al. | |
| 9,258,742 B1* | 2/2016 | Pianigiani | ............. H04L 67/327 |
| 2009/0227231 A1 | 9/2009 | Hu et al. | |
| 2009/0254494 A1 | 10/2009 | Li et al. | |
| 2009/0307746 A1 | 12/2009 | Di et al. | |

(Continued)

FOREIGN PATENT DOCUMENTS

EP      2296309 A1      3/2011

OTHER PUBLICATIONS

Enabling Agile Service Chaining with Service Based Routing, Copyright Huawei Technologies Co., Ltd.2013.

(Continued)

*Primary Examiner* — Brandon Hoffman
*Assistant Examiner* — Samuel Ambaye
(74) *Attorney, Agent, or Firm* — Duft Bornsen & Fettig, LLP (57) ABSTRACT

Embodiments described herein provide security for end users of User Equipment (UE) that utilize service chaining for Service Data Flows (SDFs). One embodiment comprises a Policy and Charging Rules Function (PCRF) that determines that a service chain is enabled for a SDF requested by an end user of a UE. The PCRF identifies a service function implemented in the service chain that processes the SDF based on a generic security policy, and identifies a security rule for the end user for filtering the SDF by the service function. The PCRF provides the security rule to the service function for filtering the SDF within the service chain.

21 Claims, 5 Drawing Sheets

(56) References Cited

U.S. PATENT DOCUMENTS

| | | |
|---|---|---|
| 2011/0022580 A1 | 1/2011 | Badulescu et al. |
| 2012/0233656 A1 | 9/2012 | Rieschick et al. |
| 2012/0331516 A1 | 12/2012 | Perez Martinez et al. |
| 2013/0041994 A1* | 2/2013 | Terrien .................... H04L 43/16 709/223 |
| 2013/0117092 A1* | 5/2013 | Cai ........................ H04L 12/14 705/14.31 |

OTHER PUBLICATIONS

Enabling Service Chaining on Cisco Nexus 1000V Series, 2013 Cisco.
Haeffner, Service Function Chaining, BOF Session IETF88, Vancouver, 44th Meeting of ITG 5.2.4 Expert Group, Nov. 15, 2013.
Software-defined networking: the service provider perspective, Ericsson Review, Feb. 21, 2013.

* cited by examiner

SECURITY SERVICES FOR END USERS THAT UTILIZE SERVICE CHAINING

FIELD OF THE INVENTION

The invention is related to the field of mobile communications technology.

BACKGROUND

A 3G/4G network provides end users with mobile data services utilizing User Equipment (UE) such as smartphones, laptops, tablets, and smart watches. For example, an end user may utilize a UE to engage in sessions with a 3G/4G network in order to exchange packets of data with a Packet Data Network (PDN) such as the Internet.

When an end user utilizes a UE to initiate a session over a 3G/4G network (e.g., an IP Connectivity Access Network (IP-CAN) session), the session request from the UE includes a description of the requested service (e.g., online gaming, IP-TV, etcetera). The 3G/4G network reserves a bearer path (e.g., an IP-CAN bearer) of a defined capacity, delay, and bit error rate. A flow of packets over the 3G/4G network may then begin for the service, which is referred to as a Service Data Flow (SDF).

Service chaining is the concept of applying an ordered set of services to an SDF using service enablers. Besides basic routing and forwarding functions, a service chain may include Transmission Control Protocol (TCP) optimization, video optimization, advertisement insertion, and/or website optimization. 3G/4G service providers are increasingly moving towards the use of service chains within their networks, because service chains can be used to implement value added services for the end user that can be monetized.

SUMMARY

Embodiments described herein provide security for end users of User Equipment (UE) that utilizes service chaining for Service Data Flows (SDFs). When a SDF passes through a service chain, a service function implemented in the service chain is identified. The service function in the service chain processes the SDF based on a generic security policy. For instance, the generic security policy may be a network-wide policy implemented by a network operator for SDFs having a particular media type. A security rule is identified for the end user for filtering the SDF by the service function, and the security rule is provided to the service function for filtering the SDF within the service chain. Utilizing security rules defined for an end user, customized filtering policies may be implemented specifically for the end user that are more detailed and specific to a particular end user than a generic security policy that may be applied to SDFs by a network operator.

One embodiment comprises a Policy and Charging Rules Function (PCRF) that is configured to determine that a service chain is enabled for a SDF requested by an end user of a UE. The PCRF is configured to identify a service function implemented in the service chain that processes the SDF based on a generic security policy, and to identify a security rule for the end user for filtering the SDF by the service function. The PCRF is configured to provide the security rule to the service function for filtering the SDF within the service chain.

In an embodiment, the PCRF is configured to provide the security rule to the service function via a Policy and Charging Enforcement Function (PCEF).

In an embodiment, the PCRF is configured to transmit the security rule to the PCEF within an enhanced Diameter message, where an Attribute Value Pair (AVP) is defined for the security rule in the enhanced Diameter message.

In an embodiment, the enhanced Diameter message comprises one of a Credit Control Answer (CCA) message and a Re-Auth Request (RAR) message with new security AVPs.

In an embodiment, the new security AVPs comprises at least one of a Security-Rule-Install AVP, a Security-Rule-Remove AVP, a Security-Rule-Definition AVP, a Security-Rule-Base-Name AVP, a Security-Rule-Name AVP, a Security-Filter AVP, a Security-Rule-Activate-Time AVP, and a Security-Rule-Deactivate-Time AVP.

In an embodiment, the security rule comprises filtering content in the SDF by the service function.

In an embodiment, the security rule comprises blocking the SDF by the service function based on at least one of a location of the end user and a time-of-day for the end user.

Another embodiment comprises a method for providing security for end users of UE that utilize service chaining for SDFs. The method comprises determining, by a PCRF, that a service chain is enabled for a SDF requested by an end user of a UE. The method further comprises identifying, by the PCRF, a service function implemented in the service chain that processes the SDF based on a generic security policy. The method further comprises identifying, by the PCRF, a security rule for the end user for filtering the SDF by the service function. The method further comprises providing, by the PCRF, the security rule to the service function for filtering the SDF within the service chain.

Another embodiment comprises a PCEF that is configured to determine that a service chain is enabled for a SDF requested by an end user of UE. The PCEF is configured to determine an ID of a service function implemented in the service chain that processes the SDF based on a generic security policy, and to provide the ID to a PCRF. The PCEF is configured to receive a security rule from the PCRF for filtering the SDF by the service function, and to provide the security rule to the service function for filtering the SDF within the service chain.

Other example embodiments may be described below.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific example embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
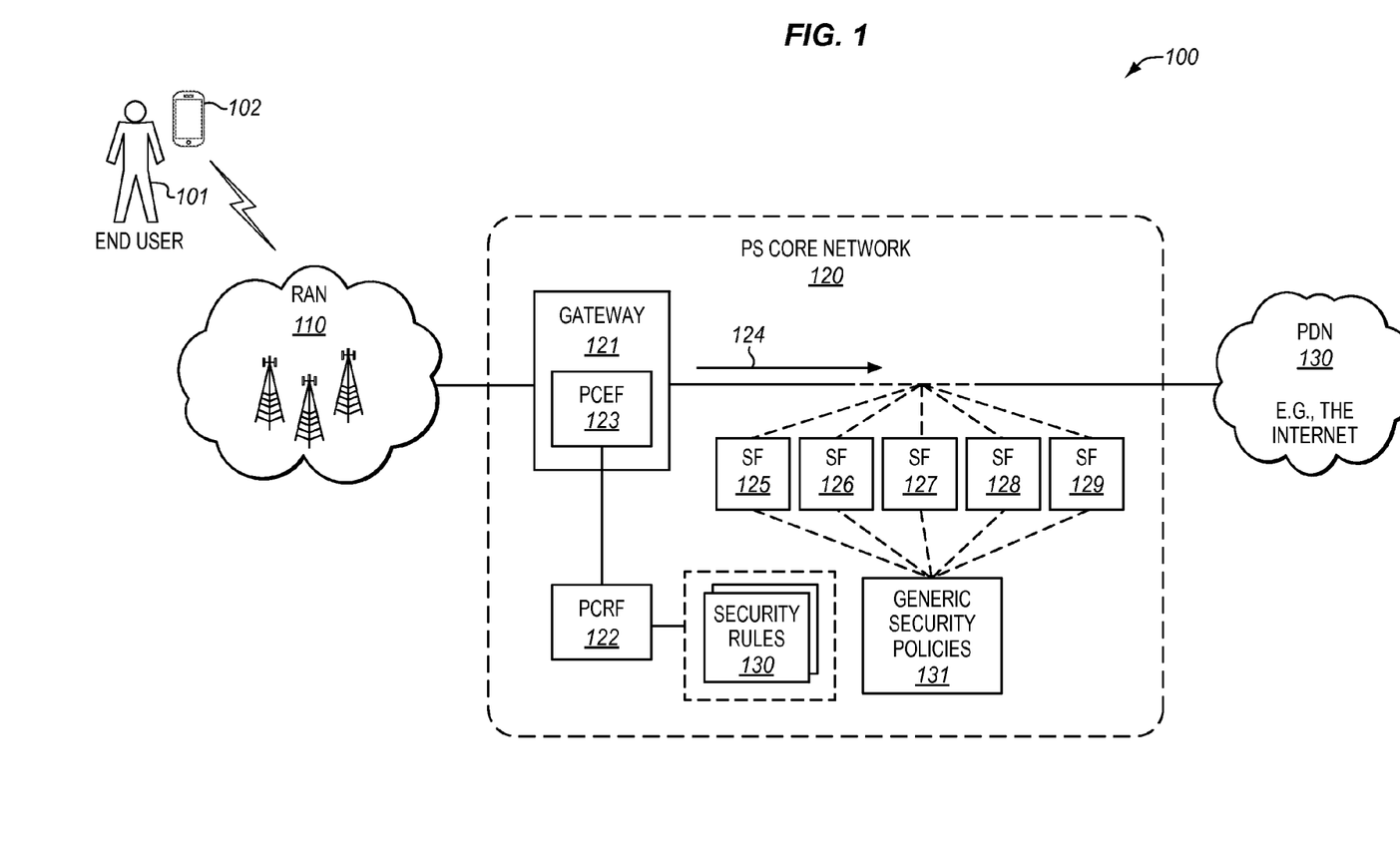
FIG. 1 illustrates a communication system in an example embodiment.

FIG. 1 illustrates a communication system 100 in an example embodiment. Communication system 100 may represent a Long Term Evolution (LTE) network or another type of Third Generation (3G), Fourth Generation (4G), or later generation communication network. Communication system 100 includes a Radio Access Network (RAN) 110 and a Packet-Switched (PS) core network 120. RAN 110 and PS core network 120 provide mobile communication service to end user 101 utilizing devices, such as User Equipment (UE) 102. PS core network 120 includes a gateway 121 that communicate with a Packet Data Network (PDN) 130, such as the Internet. Some examples of gateway 121 include a Packet Data Network Gateway (PGW) of an Evolved Packet Core (EPC) network as described in the LTE standards (which may include a Policy and Charging Enforcement Function (PCEF) 123. Another example of gateway 121 is a Gateway GPRS Support Node (GGSN) of a GPRS network. PS core network 120 may include many more network elements that are not shown in FIG. 1.

PS core network 120 establishes and maintains sessions for UE 102 for end user 101 to allow UE 102 to access data services. UE 102 is a mobile terminal, such as a mobile phone, a computer, a tablet, etc. UE 102 is able to access PS core network 120 through RAN 110, which comprises any type of network that interfaces UEs with PS core network 120. Some examples of RAN 110 are a UMTS Terrestrial Radio Access Network (UTRAN), an enhanced UTRAN (E-UTRAN), an Interworking-Wireless Local Area Network (I-WLAN), etc. The sessions over PS core network 120 as described herein may be referred to as an IP Connectivity Access Network (IP-CAN) session. An IP-CAN session is an association between UE 102 (represented by an IPv4 address and/or an IPv6 prefix) and PDN 130. An IP-CAN session may incorporate one or more IP-CAN bearers. An IP-CAN bearer is an IP transmission path of a defined capacity, delay and bit error rate, etc. Each IP-CAN bearer may be made up of one or more Service Data Flows (SDFs) 124, which includes a flow of packets.

Communication system 100 provides services, referred to as value-added services, to data traffic that is exchanged between UE 102 and PDN 130 utilizing various service functions 125-129. For example, some service functions 125-129 include traffic compression, video optimization, web caching, HTTP header enrichment, firewalls, content scanning, malware detection, etc. Service functions 125-129 illustrated in FIG. 1 may implement any number of services to SDF 124 in a service chain. As used herein the term "function" refers to a tangible collection of one or more electronic entities configured to provide the described functionality of the function. Thus, a function may be or include a processor, controller, finite state machine, discrete and/or integrated electronic features configured by instructions (e.g. software) and/or hard-wired to provide all or a portion of the described functionality.

A service chain is an ordered set of services that are interconnected in series through the network to support an application. Service chaining allows multiple service nodes to be included in a service path so that the packets that belong to a particular packet flow can travel through the service nodes in the service chain. The service path consists of an ordered list of services to be applied to a packet flow and it is used to define the service chain. FIG. 1 illustrates that the value-added services are provided by a series of specialized service functions 125-129 that apply the services to SDF 124. Service functions 125-129 are organized in series in any desired sequence depending on the services that are applied to SDF 124. Such services may depend upon any number of factors, such as the media type of SDF 124. For instance, if SDF 124 is an HTTP session, then the order and/or type of service function applied to SDF 124 may be different than if SDF 124 is a Voice over IP (VoIP) call.

Service chaining can be implemented in a number of ways in communication system 100 as a matter of design choice. For instance, a server, e.g. PCEF 123, or specialized service chain enforcement point (at network ingress for example) could stack a set of IDs that identify service functions 125-129 (which may also be referred to as an application ID) onto a packet as it is switched through communication network 100. The IDs indicate the various service functions and order of the service functions in the service chain. The first ID causes the network to route the packet to the first service function in the chain. The first service function pops its ID from the stack, and forwards the packet to the next service function indicated by the next ID in the stack. This process continues as the packet progresses through the service chain.

In a service chaining environment, it is likely that a network operator for communication system 100 may define generic security policies 131 for one or more service functions 125-129 that may be considered as default settings for service functions 125-129. For instance, if a service chain for an email data session is in place, then generic security policies 131 may be put in place by the network operator to block certain senders from being able to transmit email across communication network 100. However, this type of network-wide policy lacks any specific security considerations for end user 101, which may have specialized security concerns. For instance, end user 101 may be a minor child, and a parent of the child may have specific security concerns that are more detailed and specific than what a network-wide policy could provide.

In FIG. 1, assume for discussion purposes that UE 102 registers with communication network 100 in order to receive services from network 100. At some point, UE 102 requests a session to stream audio, stream video, place a VoIP voice call, play an online game, watch IP-TV, etc., each of which involves a flow of packets referred to as a SDF (e.g., SDF 124). These types of sessions and services are referred to generally as data services.

Assume further for discussion purposes that end user 101 of UE 102 has security rules 130 that are accessible to PCRF 122. For instance, security rules 130 may be located within a Home Subscriber Server (HSS) profile for end user 101, may be stored by a Subscriber Profile Repository (SPR), and/or may be stored by PCRF 122. In this embodiment, security rules 130 are specific to end user 101 and are implemented by one or more service functions 125-129. For instance, security rules 130 for end user 101 may be used by one or more service functions 125-129 to remove and/or modify the contents of SDF 124. Some examples of content based activities that may be performed on SDF 124 include detecting/removing keywords (e.g., from emails, SMS messages, etc.), detecting/removing malware (e.g., from data), detecting/removing malicious HTTP links (e.g., from emails, websites, Short Message Service (SMS) messages, etc.). Security rules 130 may be used by one of service functions 125-129 to temporarily block certain media types of SDF 124, which may be performed during a certain time-of-day and/or based on a location of end user 101. For instance, security rules 130 may be used by one or more service functions 125-129 to block SMS messages to/from UE 102 when end user 101 is in school, which may be based on a time-of-day and/or a location of end user 101.

Figure 2:
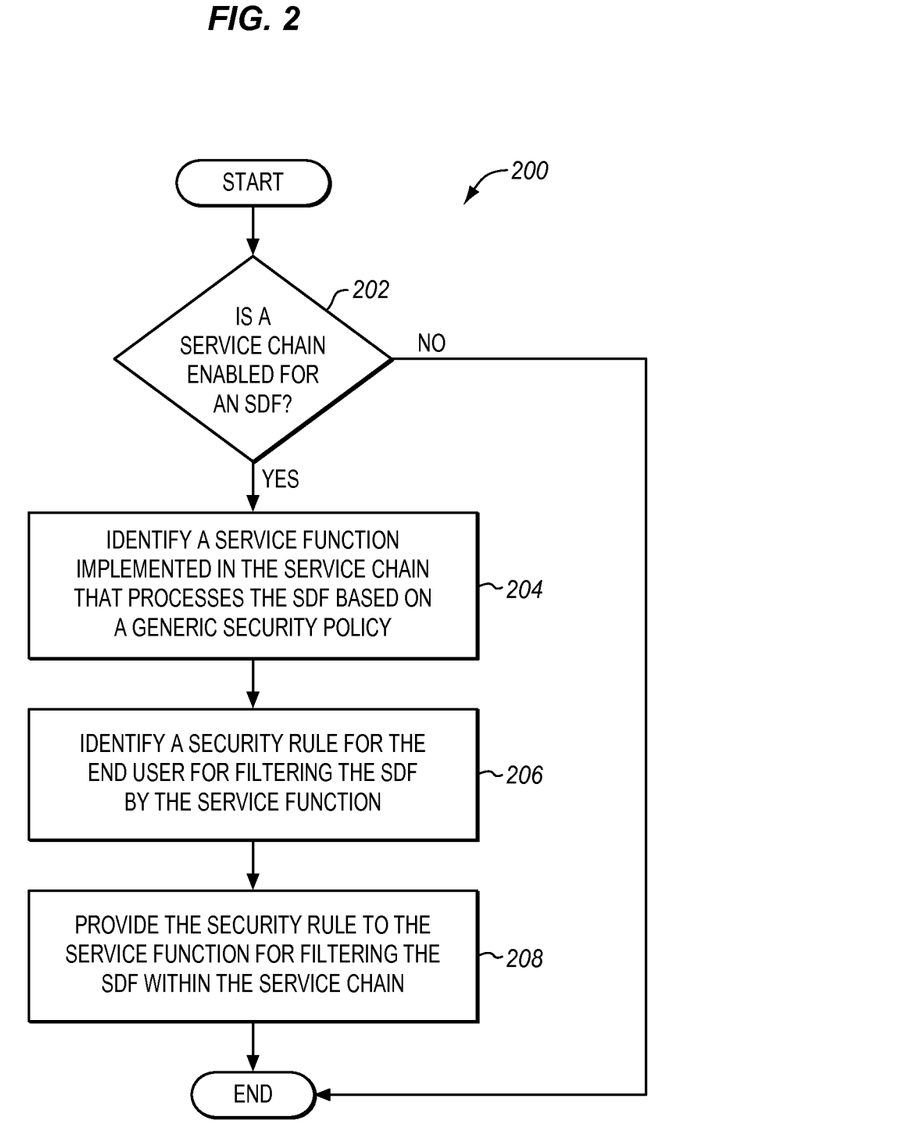
FIG. 2 is a flow chart illustrating a method for providing security for end users of UE that utilize service chaining for SDFs in an example embodiment.

FIG. 2 is a flow chart illustrating a method 200 for providing security for end users of UE that utilize service chaining for SDFs in an example embodiment. The steps of method 200 will be described with reference to communication network 100 in FIG. 1, although method 200 may be performed in other networks or systems. The steps of the flow charts described herein are not all-inclusive and may include other steps not shown. The steps may also be performed in an alternative order.

As SDF 124 flows across PS core network 120, SDF 124 may be processed by a service chain that includes one or more of the service functions 125-129. As discussed previously, packets within SDF 124 may be tagged with information that identifies the particular service functions 125-129 and the order that SDF 124 is applied to service functions 125-129. PCRF 122 determines whether a service chain is enabled for SDF 124 (see step 202 of FIG. 2). To do so, PCRF 122 may analyze, or receive information about, IDs in the packets that identify various service functions 125-129. This information may be provided to PCRF 122 by PCEF 123 and/or by a Traffic Detect Function ((TDF), not shown in FIG. 1), which may be part of a Policy and Charging Control (PCC) architecture for communication network 100.

If a service chain is enabled for SDF 124, PCRF 122 identifies one of service functions 125-129 in the service chain that processes SDF 124 based on generic security policies 131 (see step 204 of FIG. 2). For instance, PCRF 122 may identify service function 125 is part of the service chain for SDF 124, and that service function 125 is processing SDF 124 using generic security policies 131. If no service chain is enabled for SDF 124, then method 200 may end.

PCRF 122 identifies security rules 130 for end user 101 for filtering SDF 124 by the identified service function (e.g., service function 125) in step 206. To identify security rules 130, PCRF 122 may match an application ID for the identified service function with security rules 130. For instance, if service function 125 performs an email inspection function for SDF 124, then one of security rules 130 may pertain to content scanning of emails, to HTTP link removal within emails, to malware detection within emails, etc. Thus, the particular security rules 130 that applies to service function 125 (in continuing with the example), is identified.

PCRF 122 provides the identified security rule(s) 130 to the identified service function (e.g., service function 125), in step 208. PCRF 122 may provide the identified security rule(s) 130 to the service function directly, and/or via PCEF 123. For instance, PCRF 122 may forward the identified security rules 130 to PCEF 123 within an enhanced Diameter message (e.g., a Credit Control Answer (CCA) message or a Re-Auth Request (RAR) message) that includes new security Attribute Value Pairs (AVPs), which then is able to forward security rules(s) to the identified service functions 125-129. Utilizing security rules 130, the identified service functions 125-129 are able to filter SDF 124 for end user 101 within the service chain.

In some embodiments, the enhanced Diameter message includes one or more security AVPs associated with security rules 130. The security AVPs may include a Security-Rule-Install AVP, a Security-Rule-Remove AVP, a Security-Rule-Definition AVP, a Security-Rule-Base-Name AVP, a Security-Rule-Name AVP, a Security-Filter AVP, a Security-Rule-Activate-Time AVP, and/or a Security-Rule-Deactivate-Time AVP. These AVPs may be utilized by PCRF 122 and/or PCEF 123 to exchange security-based information within the enhanced Diameter messages (e.g., RAR messages, CCA messages, Credit Control Request (CCR) messages, etc.).

In some embodiments, security rules 130 may be used to block SDF 124 when certain conditions are met. Security rules 130 may specify that a location and/or a time-of-day for end user 101 is a criterion that may be used by a service function when determining whether to allow SDF 124 to flow across network 100. For instance, security rules 130 may specify that SDF 124 is blocked during school hours, when end user 101 is on school grounds, etc.

Communication system 100 is able to provide security services that are specific to end user 101 that go beyond the typical network-wide global security policies 131 that may be implemented by a network operator, and may be more relevant to end user 101. For instance, if end user 101 is a child, then a parent of the child may wish to block or filter certain types of activity that end user 101 is able to perform using UE 102. Communication system 100 is capable of achieving this goal in part, by associating security rules 130 with end user 101.

Figure 3:
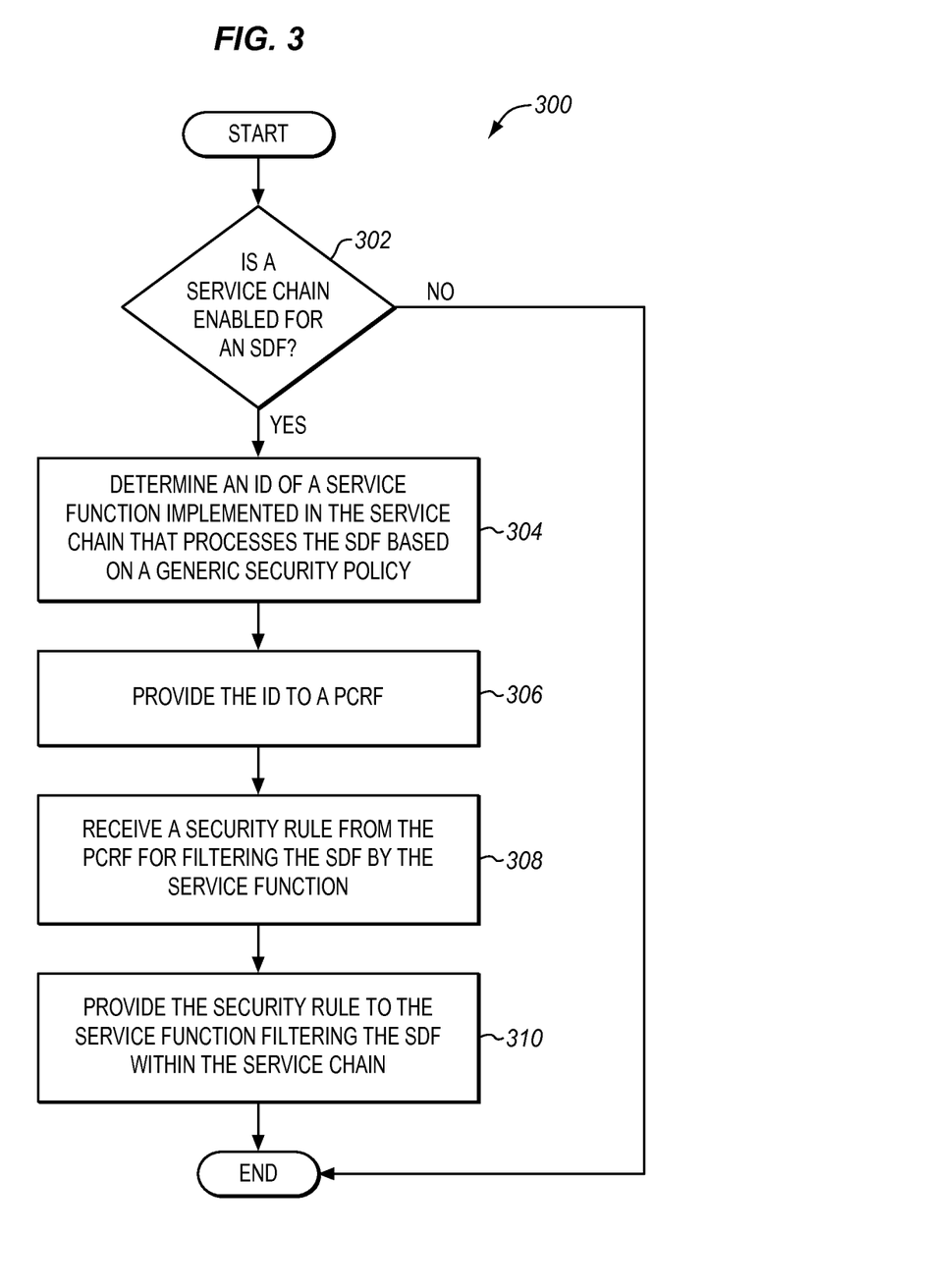
FIG. 3 is a flow chart illustrating another method for providing security for end users of UE that utilize service chaining for SDFs in an example embodiment.

FIG. 3 is a flow chart illustrating another method 300 for providing security for end users of UE that utilize service chaining for SDFs in an example embodiment. The steps of method 300 will be described with reference to communication network 100 in FIG. 1, although method 300 may be performed in other networks or systems.

As SDF 124 flows across PS core network 120, SDF 124 may be processed by a service chain that includes one or more of the service functions 125-129. As discussed previously, packets within SDF 124 may be tagged with information that identifies the particular service functions 125-129 and the order that SDF 124 is applied to the service functions 125-129. PCEF 123 determines whether a service chain is enabled for SDF 124 (see step 302 of FIG. 3). To do so, PCEF 123 may analyze, or receive information about, IDs in the packets that identify various service functions 125-129. This information may be provided to PCEF 123 by a Traffic Detect Function, which may be part of a Policy and Charging Control (PCC) architecture for communication network 100.

If a service chain is enabled for SDF 124, then PCEF 123 identifies an ID of one of service functions 125-129 in the service chain that processes SDF 124 based on generic security policies 131 (see step 304 of FIG. 3). For instance, PCEF 123 may identify service function 125 is part of the service chain for SDF 124, and that service function 125 is processing SDF 124 using generic security policies 131. The ID may be identified within the packets that flow in SDF 124. If no service chain is enabled for SDF 124, then method 300 may end.

PCEF 123 provides the ID to PCRF 122 (see step 306 of FIG. 3). To do so, PCEF 123 may transmit a CCR message to PCRF 122 that includes the ID for one of the service functions 125-129 (e.g., an ID for service function 125).

PCEF 123 receives security rules 130 from PCRF 122 for filtering SDF 124 by one of service functions 125-129 previously identified (see step 308 of FIG. 3). For instance, PCEF 123 may receive one or more security rules 130 for end user 101 that are tailored to the functionality performed by service function 125. PCEF 123 may receive security rules 130 in an enhanced Diameter message (e.g., a CCA message or a RAR message).

PCEF 123 provides security rules 130 to one of service functions 125-129 previously identified (e.g., service function 125) to allow filtering of SDF 124 within the service chain.

Example

Figure 4:
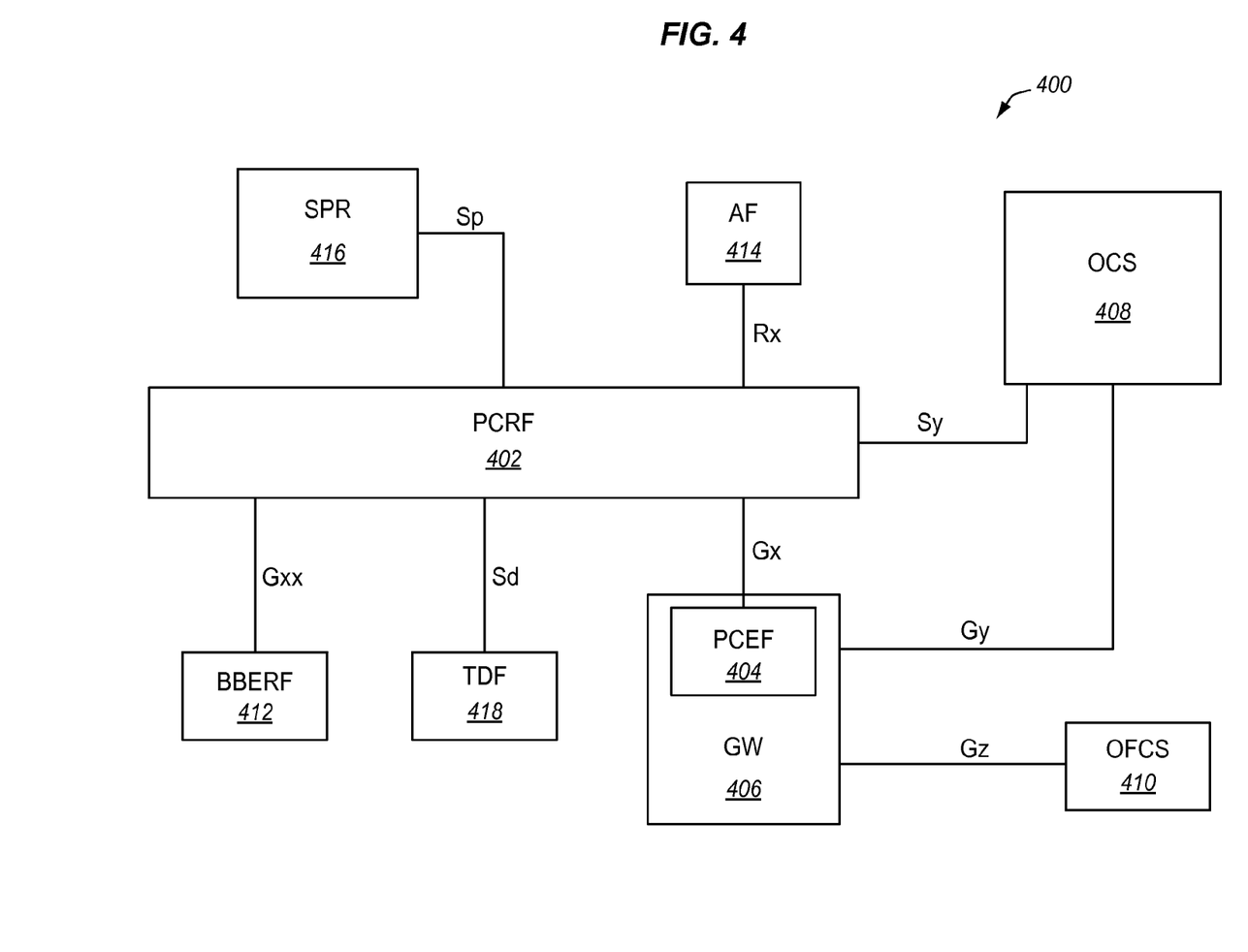
FIG. 4 illustrates a PCC architecture for a packet core network in an example embodiment.

FIG. 4 illustrates a PCC architecture 400 for a packet core network in an example embodiment. PCC architecture 400 may be used in a Long Term Evolution/Evolved Packet Core (LTE/EPC) network or another type of 4G network. PCC architecture 400 includes a Policy and Charging Rules Function (PCRF) 402 and a Policy and Charging Enforcement Function (PCEF) 404 that together provide a Policy and Charging Control (PCC) solution for a packet core network.

PCRF 402 encompasses policy control decision and flow-based charging control functionalities. Therefore, PCRF 402 is a node of the packet core network that generates PCC rules for a requested service, which is referred to as a PCC decision. PCRF 402 may include a policy engine (not shown) that makes the PCC decision. Although the term "PCRF" is used in this description, the functionality of PCRF 402 is applicable to any network node that makes policy decisions in a packet core network. PCRF 402 has been enhanced in this embodiment to allow for the implementation of security services for service data flows that are applied on a per-user basis. The particulars of the enhancements will be discussed with regard to FIG. 5.

PCEF 404 encompasses service data flow detection, policy enforcement, and flow-based charging functionalities. Therefore, PCEF 404 is a node of the packet core network that enforces the PCC rules for the requested service. For example, PCEF 404 may set up bearer connections for the service, modify existing bearer connections, ensure that only authorized service data flows are established, ensure that QoS limits are not exceeded, etc. PCEF 404 is typically implemented in a gateway (GW) 406, such as a packet data gateway (P-GW) in an EPC network. PCEF 404 has been enhanced in this embodiment to allow for the implementation of security services for service data flows that are applied on a per-user basis. The particulars of the enhancements will be discussed with regard to FIG. 5.

PCC architecture 400 further includes an Online Charging System (OCS) 408, an Offline Charging System (OFCS) 410, a Bearer Binding and Event Reporting Function (BBERF) 412, an application function (AF) 414, a Subscriber Profile Repository (SPR) 416, and a Traffic Detection Function (TDF) 418. OCS 408 provides online charging for services/sessions accessed by end users. In addition, OCS 408 stores charging rules/plans for the end users which PCRF 402 may use when making a PCC decision. For example, charging rules may define that an end user is a prepaid subscriber, and may define tariffs for different services requested by the end user. PCRF 402 interfaces with OCS 408 via a Diameter Sy interface or any other protocol to exchange charging rules/plans with OCS 408.

AF 414 is an element providing applications that require dynamic policy and/or charging control. AF 414 communicates with PCRF 402 to transfer dynamic session information used for PCC decisions, and to receive session-specific information and notifications about bearer level events. For example, AF 414 may provide IP-addresses, port numbers, bit rates, delay sensitivity, etc., for requested services to PCRF 402. PCRF 402 may then use this information when making the PCC decision. AF 414 communicates with PCRF 402 via a Diameter Rx interface or other suitable protocol interface. One example of AF 414 is a Proxy-Call Session Control Function (P-CSCF) of an IP Multimedia Subsystem (IMS).

SPR 416 is a logical entity that stores subscriber/subscription related information (i.e., subscriber profiles) used for subscription-based policies, and stores PCC rules generated by PCRF 402. SPR 416 interfaces with PCRF 402 via a Diameter Sp interface or any other protocol used to exchange policy rules with PCRF 402. SPR 416 has been enhanced in this embodiment to allow for the implementation of security services for service data flows that are applied on a per-user basis. For instance, SPR 416 may store security rules for end users that utilize a network that PCC 400 operates within. The particulars of the enhancements will be discussed with regard to FIG. 5.

TDF 418 is a functional entity that performs application detection, and reports detected applications and their service data flow descriptions to PCRF 402. TDF 418 may also perform gating, redirection, and bandwidth limitation if a service data flow description cannot be provided to PCRF 402. In some embodiments, TDF 418 is enhanced to allow for the implementation of security services for service data flows that are applied on a per-user basis. For instance, TDF 418 may perform packet inspection on SDFs to determine if the SDFs are part of a service chain. The particulars of the enhancements will be discussed with regard to FIG. 5.

OFCS 410 provides offline charging for services/sessions accessed by end users. OFCS 410 receives charging events from PCEF 404 over a Gz interface and generates Charging Data Records (CDRs), which are sent to a billing system.

Figure 5:
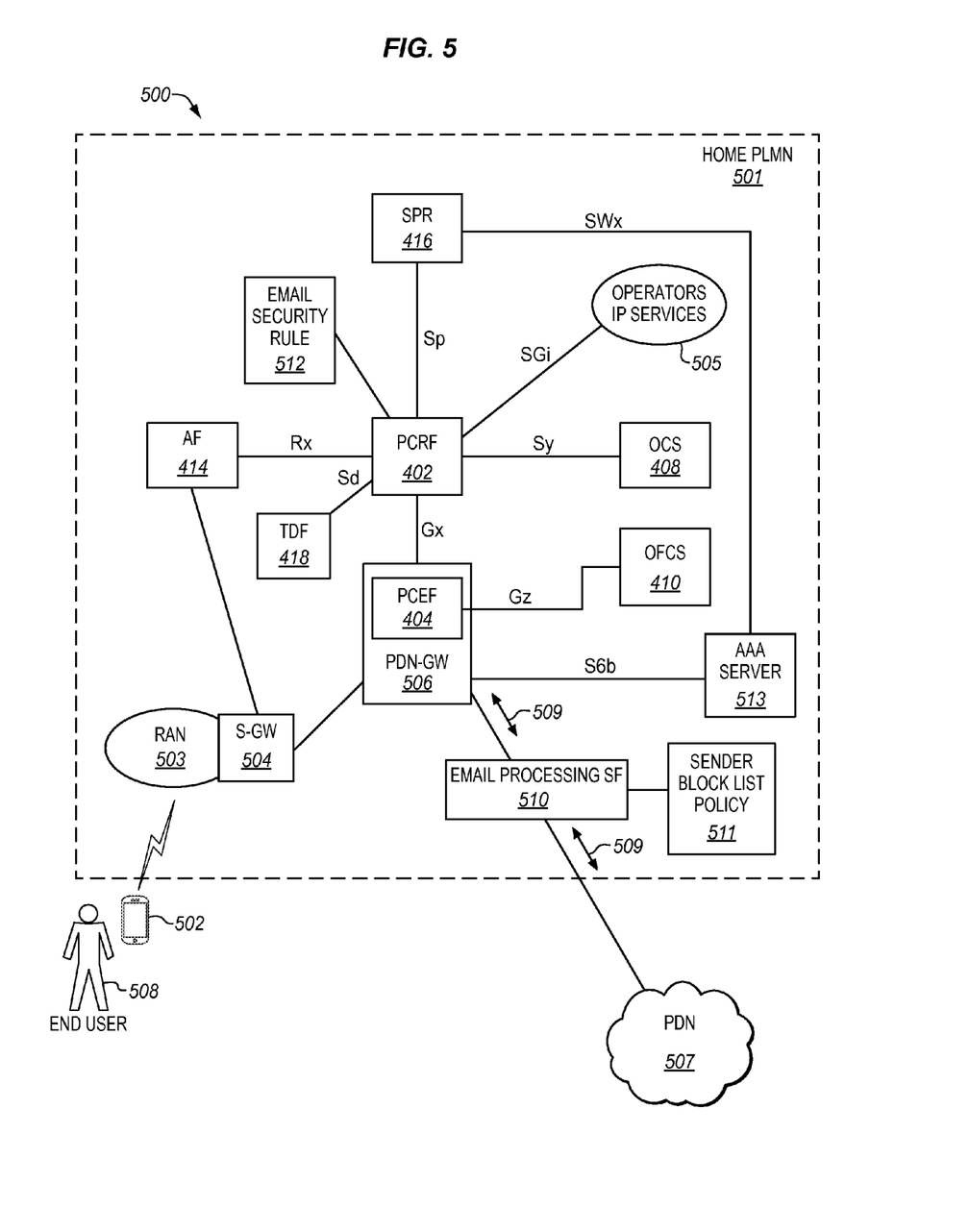
FIG. 5 illustrates an LTE network using the PCC architecture of FIG. 4 in an example embodiment.

The PCC architecture 400 of FIG. 4 may be implemented in an LTE network or another type of 4G network. FIG. 5 illustrates an LTE network 500 using the PCC architecture 400 of FIG. 4 in an example embodiment. LTE network 500 includes a home Public Land Mobile Network (PLMN) 501. Home PLMN 501 represents a packet core network where an end user 508 of a UE 502 has subscribed to a service plan. Home PLMN 501 includes the following nodes of a PCC architecture, e.g. the PCC architecture 400: PCRF 402, PCEF 404 implemented in a packet data network gateway (PDN-GW) 506, OCS 408, OFCS 410, application function (AF) 414, SPR 416, and TDF 418. In addition, home PLMN 501 includes a 3GPP Radio Access Network (RAN) 503, a serving gateway (S-GW) 504, operator's IP services 505 (e.g., IP Multimedia Subsystem (IMS)), and an Authentication, Authorization and Accounting (AAA) server 513.

PDN-GW 506 is connected to one or more Packet Data Networks (PDN) 507, such as the Internet. When SDF 509 is established for a data service, SDF 509 flows through a service chain. In this example, SDF 509 flows through an email processing service function 510, which implements a generic security policy 511 to block specific email senders. Policy 511 in this embodiment is configured by the network operator as a generic security policy that is applied to any service data flows that include email content.

Assume for discussion purposes for this embodiment that end user 508 of UE 502 has subscribed to a security service plan with the operator of network 500. The security service plan defines email security rules 512 that will be applied to service data flows for end user 508 that include emails. In this embodiment, a parent of end user 508 has configured the security service plan for end user 508 to scan emails sent to end user 508 and to filter out a list of keywords from the emails. This list of keywords for end user 508 is stored in email security rule 512.

In FIG. 5, in order to access a data service, UE 502 sends a request for a data session to RAN 503. The session request includes a description (e.g., Session Description Protocol (SDP) description) of an initial data service being requested. For example, if the initial data service is a VoIP call, then the session description will specify a VoIP call along with other session parameters. PCEF 404 receives the request to initiate or establish a data session from UE 502, and then sends a request for PCC rules to PCRF 402 over the Gx reference point. PCRF 402 is tasked with making a PCC decision for the data session. Therefore, PCRF 402 obtains subscriber data and/or charging rules from SPR 416 over the Sp reference point, and generates PCC rules for the initial data service. PCRF 402 then transmits a response to PCEF 404 that includes the PCC rules for the initial data service.

PCEF 404 then applies the PCC rules to the data session. Applying the PCC rules is also referred to as enforcing the PCC decision. When applying the PCC rules, PCEF 404 enforces policy control through gate enforcement and QoS enforcement, and enforces charging control based on the charging method, which is offline charging in this example. Thus, PCEF 404 establishes the service data flow and collects charging information. PCEF 404 then interfaces with OFCS 410 and sends the offline charging information to OFCS 404. As the data session is active, SDF 509 flows between PDN-GW 506 and PDN 507.

End user 508 generates an email, and a service chain is temporarily established by home PLMN 501 to apply the generic sender block list policy 511 utilizing SF 510. PCRF 402 detects that a service chain is enabled for SDF 509, which includes SF 510. PCRF 402 may detect SF 510 in the chain using an ID assigned to SF 510. For instance, PCEF 404 may generate a CCR message for PCRF 402 that includes an ID (e.g., an application ID) assigned to SF 510; PCRF 402 may receive the ID from TDF 418, etc. PCRF 402 identifies an email security rule 512 for end user 508 that applies to SF 510. For instance, email security rule 512 may map an application ID for email processing service functions (e.g., SF 510) to various rules that can be implemented by the service functions. In the example, a parent of end user 508 has created a rule to filter out a list of key words from the emails. PCRF 402 locates the email security rule 512 for end user 508, which may be stored at an HSS, at SPR 416, or within PCRF 402, and provides the email security rule 512 to SF 510. PCRF 402 may provide email security rule 512 to SF 510 via PCEF 404 over the Gx reference point. SF 510 receives email security rule 512, and processes the email from end user 508 in the service chain to remove key words from the email that have been specified by the parent of end user 508 in email security rule 512.

One of ordinary skill in the pertinent art will appreciate that the PCC architecture 400 of FIG. 4 may be adapted to other similar embodiments within the scope of the claims, e.g. to provide and enforce other rule sets.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as non-transitory instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. An apparatus comprising:
a processor and a memory, the memory including instructions that when executed configure the processor to implement a Policy and Charging Rules Function (PCRF) configured to determine that a service chain is enabled for a Service Data Flow (SDF) requested by an end user of User Equipment (UE), to identify a service function implemented in the service chain that processes the SDF based on a generic security policy, and to identify a security rule for the end user for detecting and removing by the service function a selected portion of content of the SDF that is presented to the end user;
the PCRF is configured to provide the security rule to the service function for detecting and removing the selected portion of the SDF.

2. The apparatus of claim 1, wherein:
the PCRF is configured to provide the security rule to the service function via a Policy and Charging Enforcement Function (PCEF).

3. The apparatus of claim 2, wherein:
the PCRF is configured to transmit the security rule to the PCEF within an enhanced Diameter message; and
an Attribute Value Pair (AVP) is defined for the security rule in the enhanced Diameter message.

4. The apparatus of claim 3, wherein:
the enhanced Diameter message comprises one of a Credit Control Answer (CCA) message and a Re-Auth Request (RAR) message with new security AVPs.

5. The apparatus of claim 4, wherein the new security AVPs comprises at least one of:
a Security-Rule-Install AVP;
a Security-Rule-Remove AVP;
a Security-Rule-Definition AVP;
a Security-Rule-Base-Name AVP;
a Security-Rule-Name AVP;
a Security-Filter AVP;
a Rule-Activate-Time AVP; and
a Security-Rule-Deactivate-Time AVP.

6. The apparatus of claim 1, wherein the security rule comprises blocking the SDF by the service function based on at least one of a location of the end user and a time-of-day for the end user.

7. The apparatus of claim 1, wherein detecting and removing the selected portion of content further comprises removing keywords from the SDF.

8. The apparatus of claim 1, wherein the content comprises at least one of a website, a Short Message Service (SMS) message, and an email message.

9. The apparatus of claim 1, wherein detecting and removing the selected portion of content further comprises removing Hypertext Transfer Protocol (HTTP) links from the SDF.

10. The apparatus of claim 1, wherein detecting and removing a selected portion of content further comprises removing malware from the SDF.

11. A method for providing security for end users of User Equipment (UE) that utilize service chaining for a Service Data Flow (SDF), the method comprising:
   determining, by a Policy and Charging Rules Function (PCRF), that a service chain is enabled for a SDF requested by an end user of a UE;
   identifying, by the PCRF, a service function implemented in the service chain that processes the SDF based on a generic security policy;
   identifying, by the PCRF, a security rule for the end user for detecting and removing by the service function a selected portion of content of the SDF that is presented to the end user; and
   providing, by the PCRF, the security rule to the service function for detecting and removing the selected portion of the SDF.

12. The method of claim 11, wherein providing the security rule to the service function further comprises:
   providing the security rule to the service function via a Policy and Charging Enforcement Function (PCEF).

13. The method of claim 12, wherein providing the security rule to the service function via the PCEF further comprises:
   transmitting an enhanced Diameter message to the PCEF, wherein an Attribute Value Pair (AVP) is defined for the security rule in the enhanced Diameter message.

14. The method of claim 13, wherein:
   the enhanced Diameter message comprises one of a Credit Control Answer (CCA) message and a Re-Auth Request (RAR) message with new security AVPs.

15. The method of claim 14, wherein the new security AVPs comprise at least one of:
   a Security-Rule-Install AVP;
   a Security-Rule-Remove AVP;
   a Security-Rule-Definition AVP;
   a Security-Rule-Base-Name AVP;
   a Security-Rule-Name AVP;
   a Security-Filter AVP;
   a Rule-Activate-Time AVP; and
   a Security-Rule-Deactivate-Time AVP.

16. The method of claim 11, wherein the security rule comprises blocking the SDF by the service function based on at least one of a location of the end user and a time-of-day for the end user.

17. An apparatus comprising:
   a processor and a memory, the memory including instructions that when executed configure the processor to implement a Policy and Charging Enforcement Function (PCEF) configured to determine that a service chain is enabled for a Service Data Flow (SDF) requested by an end user of User Equipment (UE), to determine an ID of a service function implemented in the service chain that processes the SDF based on a generic security policy, and to provide the ID to a Policy and Rules Charging Function (PCRF);
   the PCEF is configured to receive a security rule from the PCRF for by the service function a selected portion of content of the SDF that is presented to the end user, and to provide to the service function the security rule for detecting and removing the selected portion of the SDF.

18. The apparatus of claim 17, wherein:
   the PCEF is configured to receive the security rule from the PCRF within an enhanced Diameter message; and
   an Attribute Value Pair (AVP) is defined for the security rule in the enhanced Diameter message.

19. The apparatus of claim 18, wherein:
   the enhanced Diameter message comprises one of a Credit Control Answer (CCA) message and a Re-Auth Request (RAR) message with new security AVPs.

20. The apparatus of claim 19, wherein the new security AVPs comprise at least one of:
   a Security-Rule-Install AVP;
   a Security-Rule-Remove AVP;
   a Security-Rule-Definition AVP;
   a Security-Rule-Base-Name AVP;
   a Security-Rule-Name AVP;
   a Security-Filter AVP;
   a Rule-Activate-Time AVP; and
   a Security-Rule-Deactivate-Time AVP.

21. The apparatus of claim 17, wherein the security rule comprises blocking the SDF by the service function based on at least one of a location of the end user and a time-of-day for the end user.

* * * * *